United States Patent [19]

Hauser

[11] 4,118,531
[45] Oct. 3, 1978

[54] WEB OF BLENDED MICROFIBERS AND CRIMPED BULKING FIBERS

[75] Inventor: Edward R. Hauser, Saint Joseph Township, Saint Croix County, Wis.

[73] Assignee: Minnesota Mining and Manufacturing Company, Saint Paul, Minn.

[21] Appl. No.: 848,488

[22] Filed: Nov. 4, 1977

Related U.S. Application Data

[63] Continuation of Ser. No. 710,612, Aug. 2, 1976, abandoned.

[51] Int. Cl.² .................. D03D 3/00; D02G 3/00
[52] U.S. Cl. .................. 428/224; 156/62.2; 156/62.4; 428/280; 428/296; 428/297; 428/299; 428/359; 428/364; 428/362; 428/369; 428/372
[58] Field of Search .......... 428/296, 297, 298, 299, 428/359, 360, 362, 369, 370, 371, 364, 280, 224, 372; 264/6, 122

[56] References Cited

U.S. PATENT DOCUMENTS

| | | | |
|---|---|---|---|
| 2,464,301 | 3/1949 | Francis | 428/280 X |
| 2,476,282 | 7/1949 | Castellan | 428/296 |
| 3,016,599 | 1/1962 | Perry | 264/122 X |
| 3,044,914 | 7/1962 | Bell | 264/122 X |
| 3,118,750 | 1/1964 | Dunlap et al. | 428/369 X |
| 3,388,194 | 6/1968 | Vinicki | 264/6 |
| 3,551,271 | 12/1970 | Thomas et al. | 428/296 X |
| 3,589,956 | 6/1971 | Kranz et al. | 428/369 X |
| 3,595,731 | 7/1971 | Davies et al. | 428/396 X |
| 3,917,448 | 11/1975 | Wood | 156/62.2 X |
| 3,933,557 | 1/1976 | Pall | 428/296 X |

OTHER PUBLICATIONS 156 62.2;62.4

*Primary Examiner*—Lorraine T. Kendell
*Attorney, Agent, or Firm*—Cruzan Alexander; Donald M. Sell; Roger R. Tamte

[57] ABSTRACT

Mixtures of microfibers and crimped bulking fibers produce a lofty resilient web having properties that are unique for microfiber-based webs. Included in these properties are a combination of high thermal resistance per unit of thickness and moderate weight, as well as other properties which give the web a distinctive utility as thermal insulation.

11 Claims, 4 Drawing Figures

WEB OF BLENDED MICROFIBERS AND CRIMPED BULKING FIBERS

REFERENCE TO RELATED APPLICATION

This application is a continuation of application Ser. No. 710,612, which was filed Aug. 2, 1976, and is now abandoned.

BACKGROUND OF THE INVENTION

Webs of microfibers as taught in the prior art have significantly limited utility utility as thermal insulation. This is true despite the fact that previous investigators of microfibers have almost routinely included thermal insulation in their lists of potential uses for the fibers. See several patents dealing with blown microfibers, including Francis, U.S. Pat. No. 2,464,301; Ladisch, U.S. Pat. No. 2,571,457; Watson, U.S. Pat. No. 2,988,469; and Buntin et al, U.S. Pat. No. 3,849,241 (blown microfibers are very fine, discontinuous fibers prepared by extruding liquified fiber-forming material through orifices in a die into a high-velocity gaseous stream, where the extruded material is first attenuated by the gaseous stream and then solidifies as a mass of the fibers); or see Vinicki, U.S. Pat. No. 3,388,194, which describes microfibers formed by a centrifugal spinning operation. While these previous workers did not report thermal insulation values for a web of microfibers, or give any indication of having measured such values, they appear to have automatically considered that a new fibrous web should be useful as thermal insulation.

The limited value of existing microfiber webs as thermal insulation is true despite another fact, which is not set forth in any known prior literature, namely that microfiber webs provide unique insulating values. For example, a one-centimeter-thick web of polypropylene blown microfibers will give 1.8 clo of thermal resistance, in contrast to the about 0.9 exhibited by a 1-centimeter-thick web of commerical polyester staple fibers.[1] (Footnotes and methods of measurement are at the end of the specification).

The reason why existing microfiber webs have only limited value as thermal insulation is that, at least after these microfiber webs have undergone a normal compression history, they are heavier than alternative types of fibrous insulation. This heaviness is an inherent consequence of the very nature of microfibers; their very fine size and comformability causes the microfibers to come together as a dense, fine-pored web. As an illustration, a one-centimeter-thick web of blown microfibers is about five times as heavy as a one-centimeter-thick web of commercial polyester staple fibers. Even if a blown microfiber web only half as thick as a web of polyester staple fibers is used (so as to provide roughly equivalent thermal insulation resistance), the blown microfiber web will still be about two-and-one-half times as heavy as the polyester staple fiber web.

When weight is only of secondary importance (as in glove or boot insulation, for example), thin, dense, blown microfiber webs can be quite useful. But when weight is a more primary consideration, as in such insulated articles as coats, snowmobile suits, sleeping bags, etc., existing microfiber webs will be passed by. Since the latter kinds of uses are major ones, the foreclosing of microfibers from such uses is a severe limitation on their utility in the insulation field.

SUMMARY OF THE INVENTION

The present invention provides a new fibrous web which has a moderate weight comparable to or lower than the weight of alternative forms of fibrous insulation, but which nevertheless exhibits the same order of high thermal resistance per unit of thickness that characterizes existing microfiber webs. This new web incorporates microfibers (generally less than 10 micrometers in diameter), but only as one component fiber in the web. In addition, a web of the invention includes bulking fibers, i.e. crimped, generally larger-diameter fibers, which are randomly and thoroughly intermixed and intertangled with the microfibers and account for at least 10 weight-percent of the fibers in the web. The crimped bulking fibers function as separators within the web, separating the microfibers to produce a lofty resilient web capable of filling a much larger volume than a conventional microfiber web. Correspondingly, the density of the composite web is greatly reduced from that of a conventional microfiber web.

Yet, despite the dilution of the web with bulking fibers, and the loosening or opening of the web caused by those fibers, the thermal resistance per unit of thickness remains the same or is only moderately reduced in comparison to an all-microfiber web. Since a composite web of the invention is thicker than an all-microfiber web that includes the same weight of microfibers, the total thermal resistance of the web from face to face is greater than that of the all-microfiber web. And per unit of weight, the composite web provides much more insulation than an all-microfiber web. The latter advantage gives rise to a concept of "thermal insulating efficiency by weight", which is equal to the thermal resistance for a sample in clo per unit of thickness divided by the density of the web in units of weight per unit of volume. Webs of the invention have higher values of thermal insulating efficiency by weight than any other known fibrous web.

The reason for the high values of thermal resistance per unit of thickness or high values of thermal insulating efficiency per unit of weight exhibited by composite webs of the invention is not fully understood. The microfibers are spaced apart by the presence of the bulking fibers, which increases the size of the pores within the web; if fine pore structure contributes to the good insulation value of conventional microfiber webs, it does not determine the insulation value of a composite web of the invention.

The most likely explanation for the high insulating values of a web of the invention, in our view, is that a thin layer of air contacting a fiber or other surface is held by that surface against movement. Since the surface area of microfibers is greater than for larger fibers such as polyester staple fibers, more air is held in place by the microfibers, which results in a reduced transfer of heat within a web containing microfibers. Although the percentage of microfibers in a web of this invention is less than that in an all-microfiber web, sufficient microfibers are apparently retained to make the thermal resistance per unit of thickness of the web comparable to that of an all-microfiber web. Also, when the microfibers are opened up or spaced apart by the presence of bulking fibers in a web of the invention, the surface area of the microfibers is more effectively used, making it possible to hold more air in place and even further reduce the transfer of heat.

Whatever the explanation, the invention makes a major advance in the use of microfibers. A practical effect of the change made by the present invention can be shown with this illustration: A representative composite web of the invention one-half as thick and lighter in weight than the widely commercialized webs of polyester staple fibers will produce the same thermal resistance as the polyester web. Thus, a jacket insulated with a web of the invention may be thinner and lighter in weight than a jacket insulated with a polyester staple fiber web and yet be just as warm. The lesser bulk and lighter weight are significant effects, and mean that for the first time microfibers offer a significant advantage to widespread areas of the insulation field.

Webs of the invention are useful for other purposes also, especially where the presence of microfibers, with the special properties provided by them, in combination with loft and moderate density offers a special advantage.

Webs of the invention are not the first to mix microfibers with other fibers. The Francis and Watson patents noted above teach the mixing of tacky blown microfibers with preformed fibers to form a bonded web. Perry, U.S. Pat. No. 3,016,599 is directed to a method of uniformly mixing microfibers and staple fibers to form a composite web. And Wyly et al, U.S. Pat. No. 3,532,800 teaches paper-type products useful as electrical insulation for cables made by blending microfibers with staple fibers.

But none of these prior art teachings suggests the lofty resilient microfiber-based products of the present invention or the unique properties provided by such products. Loft and resilience are provided in webs of the invention by the crimped bulking fibers, thoroughly separated and mixed with the microfibers; and none of the prior-art references teaches such a blend of fibers. Use of crimped fibers in the processes of the references would require mechanical force to separate the fibers; lacking such apparatus, the prior-art processes would produce webs with isolated concentrations or clumps of crimped fibers, through which heat energy would be more rapidly transferred and which would not contribute to the lofty microfiber-based mixture that provides special properties in webs of the invention. Although the Watson and Francis patents noted above list wool fibers, which are commonly used in a crimped form, as potentially useful in their processes, it seems clear that they never prepared webs using such fibers; in any event, these references do not contemplate or suggest a web of the present invention, with its unique lofty structure obtained by a thorough blend of microfibers and crimped bulking fibers; do not teach apparatus or process conditions for preparing such a web; and do not recognize the useful properties provided by the unique structure of a web of the invention.

Loft as well as resilient compressibility and conformability, are also reduced by the bonded nature of the webs taught in prior art such as Francis and Watson. Such bonding, i.e. fiber-to-fiber bonding resulting from collection of fibers while the microfibers are tacky, is especially undesirable in webs of the invention to be used as thermal insulation for garments, sleeping bags, etc. Unbonded fiber structures of the invention, which are greatly preferred, offer excellent conformability, drape, hand and feel, which give them further appeal in the thermal insulating field.

DETAILED DESCRIPTION

Figure 1:
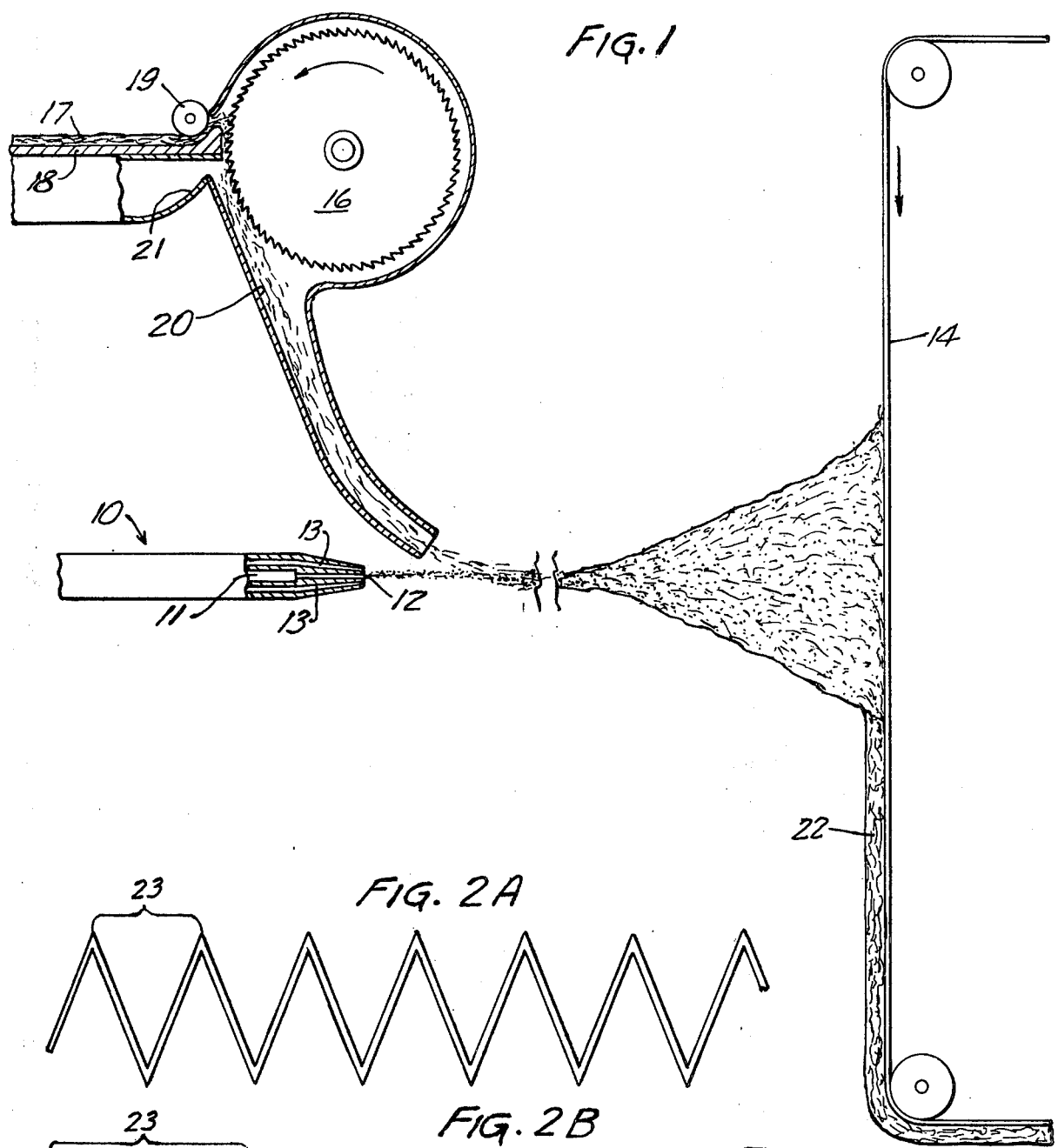
FIG. 1 is a schematic diagram of illustrative apparatus for preparing webs of the invention.

FIG. 1 of the drawing shows one arrangement of apparatus useful to prepare a web of the invention. This apparatus prepares webs with melt-blown microfibers (prepared by extruding molten fiber-forming material and which are preferred in many webs of the invention), but solution-blown and other types of microfibers may also be used. The microfiber-blowing portion of the illustrated apparatus can be a conventional structure as taught, for example, in Wente, Van A. "Superfine Thermoplastic Fibers," in Industrial Engineering Chemistry, Vol. 48, pages 1342 et seq (1956), or in Report No. 4364 of the Naval Research Laboratories, published May 25, 1954, entitled "Manufacture of Superfine Organic Fibers" by Wente, V. An.; Boone, C. D.; and Fluharty, E. L. Such as structure includes a die 10 which has an extrusion chamber 11 through which liquified fiber-forming material is advanced; die orifices 12 arranged in line across the forward end of the die and through which the fiber-forming material is extruded; and cooperating gas orifices 13 through which a gas, typically heated air, is forced at very high velocity. The high-velocity gaseous stream draws out and attenuates the extruded fiber-forming material, whereupon the fiber-forming material solidifies as microfibers during travel to a collector 14. The collector 14 is typically a finely perforated screen, which in this case is in the form of a closed-loop belt, but which can take alternative forms, such as a flat screen or a drum or cylinder. Gas-withdrawal apparatus may be positioned behind the screen to assist in deposition of fibers and removal of gas.

The crimped bulking fibers are introduced into the stream of blown microfibers in the illustrative apparatus shown in FIG. 1 through use of a lickerin roll 16 disposed above the microfiber-blowing apparatus. A web 17 of bulking fibers, typically a loose, nonwoven web such as prepared on a garnet machine or "Rando-Webber", is propelled along a table 16 under a drive roll 19 where the leading edge engages against the lickerin roll 16. The lickerin roll turns in the direction of the arrow and picks off fibers from the leading edge of the web 17, separating the fibers from one another. The picked fibers are conveyed in an air stream through an inclined trough or duct 20 and into the stream of blown microfibers where they become mixed with the blown microfibers. The air stream is generated inherently by rotation of the lickerin roll, or that air stream may be augmented by use of an auxilliary fan or blower operating through a duct 21 as known in the art.

The mixed stream of microfibers and bulking fibers then continues to the collector 14 where the fibers form a web 22 of randomly intermixed and intertangled fibers. Under close examination, the microfibers and crimped bulking fibers are found to be thoroughly mixed; for example, the web is free of clumps of crimped fibers, i.e. collections a centimeter or more in diameter of many crimped fibers, such as would be obtained if a chopped section of multi-ended tow of crimped filament were unseparated or if crimped fibers were balled together prior to introduction into a microfiber stream. The web 22 is peeled off the collector, and typically wound into a storage roll. Subsequently the web may be processed in cutting or handling operations appropriate for microfiber webs.

The composite web prepared may consist of a single layer deposited by apparatus as shown, or may be a multi-layer product (in which the layers are typically indistinguishable to at least casual inspection). Such products can be formed either by passing the collected web under mixing and depositing apparatus such as illustrated in FIG. 1 two or more times or by having additional mixing and depositing apparatus disposed along the length of a collecting belt.

The insulating quality of microfibers is generally independent of the material from which they are formed, and microfibers useful in the invention may be formed from nearly any fiber-forming material. Representative polymers for forming melt-blown microfibers include polypropylene, polyethylene, polyethylene terephthalate, polyamides, and other polymers as known in the art. Useful polymers for forming microfibers from solution include polyvinyl chloride, acrylics, and acrylic copolymers, polystyrene, and polysulfone. Inorganic materials also form useful microfibers.

The finer the microfibers in a web of the invention, the better the thermal resistance. Blown microfibers can conveniently be prepared in diameters smaller than one micrometer. To form useful webs, the aspect ratio (ratio of length to diameter) of the microfibers should approach infinity, though blown microfibers are known to be discontinuous.

Figure 2A:
FIG. 2 is side elevation view of representative crimped bulking fibers useful in webs of the invention.
Figure 2B:
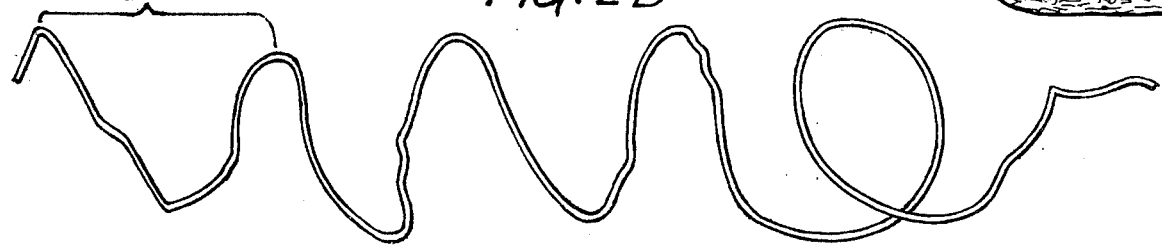
Figure 2C:

Crimped fibers, i.e. having a continuous wavy, curly, or jagged character along their length, are available in several different forms for use as the bulking fiber in a web of the invention. Three representative types of known crimped fibers are shown in FIG. 2: FIG. 2 *a* shows a generally planar, regularly crimped fiber such as prepared by crimping the fibers with a sawtooth gear; FIG. 2 *b* shows a randomly crimped (random as to the plane in which an undulation occurs and as to the spacing and amplitude of the crimp) such as prepared in a stuffing box; and FIG. 2 *c* shows a helically crimped fiber such as prepared by the so-called "Agilon" process. Three-dimensional fibers as shown in FIGS. 2 *b* and 2 *c* generally encourage greater loftiness in a web of the invention. However, good webs of the invention can be produced from fibers having any of the known types of crimp.

The number of crimps i.e. complete waves or cycles as represented by the structure 23 in FIGS. 2 *a, b,* and *c,* per unit of length can vary rather widely in bulking fibers useful in the invention. In general the greater the number of crimps per centimeter (measured by placing a sample fiber between two glass plates, counting the number of complete waves or cycles over a 3-centimeter span, and then dividing that number by 3), the greater the loft of the web. However, larger-diameter fibers will produce an equally lofty web with fewer crimps per unit of length than a smaller-diameter fiber. An indication that variation is permissible is provided by the following table, which shows the approximate crimp count we presently prefer for a given diameter fiber.

| Fiber Size | Crimp Count |
| --- | --- |
| (decitex) | (crimps/centimeter) |
| 3–20 | 3–6 |
| 20–40 | 2–5 |
| 40–100 | 1–3 |

| Fiber Size | Crimp Count |
| --- | --- |
| -continued | |
| 100–400 | 1–2 |

Processability on a lickerin roll is usually easier with smaller-diameter fibers having higher numbers of crimps per unit of length. Bulking fibers used in the invention will generally average more than about one-half crimp per centimeter, and since the bulking fibers will seldom exceed 40 decitex, we prefer fibers that have a crimp count of at least about 2 crimps per centimeter.

Crimped fibers also vary in the amplitude or depth of their crimp. Although amplitude of crimp is difficult to uniformly characterize in numerical values because of the random nature of many fibers, an indication of amplitude is given by percent crimp. The latter quantity is defined as the difference between the uncrimped length of the fiber (measured after fully straightening a sample fiber) and the crimped length (measured by suspending the sample fiber with a weight attached to one end equal to 2 milligrams per decitex of the fiber, which straightens the large-radius bends of the fiber) divided by the crimped length and multiplied by 100. Bulking fibers used in the present invention generally exhibit an average percent crimp of at least about 15 percent, and preferably at least about 25 percent. To minimize processing difficulties on a lickerin roll with fibers as shown in FIGS. 2 *a* and 2 *b* the percent crimp is preferably less than about 50 percent; but processing on a lickerin roll of helically crimped fibers as shown in FIG. 2 *c* is best performed if the percent crimp is greater than 50 percent.

The bulking fibers should, as a minimum, have an average length sufficient to include at least one complete crimp and preferably at least three or four crimps. When using equipment such as a lickerin roll, the bulking fibers should average between about 2 and 15 centimeters in length. Preferably, the bulking fibers are less than about 7–10 centimeters in length.

Many different materials are useful for forming synthetic crimped bulking fibers, which are preferred; but naturally occuring fibers may also be used. Polyester crimped staple fibers are readily available and provide useful properties. Other useful fibers include acrylics, polyolefins, polyamides, rayons, acetates, etc. Webs of the invention will have the best resistance to compression and the highest thermal insulating efficiency by weight when the bulking fibers are moderately stiff, that is, have a flexural rigidity of $1.5 \times 10^{-4}$ gram-square centimeters per tex or more (defined by W. E. Morton and J. W. S. Hearle, Physical Properties of Textile Fibers, *Butterworth, London,* 1962, p. 380–383). More preferably the bulking fibers have a flexural rigidity of at least $3.5 \times 10^{-4}$ gram-square centimeters per tex. Webs of the invention may include more than one variety of bulking fiber, as well as more than one variety of microfiber.

The finer the staple fibers, the greater the insulating efficiency of a composite web, but the web will generally be more easily compressed when the staple fibers are of a low denier. Most often, the bulking fibers will have sizes of at least 3 decitex and preferably at least 6 decitex, which correspond approximately to diameters of about 15 and 25 micrometers, respectively.

The amount of crimped bulking fibers included or blended with microfibers in a composite web of the invention will depend upon the particular use to be made of the web. Generally at least 10 weight-percent of the blend will be bulking fibers to provide the desired low weight for a given amount of thermal resistance, and preferably at least 25 weight-percent of the blend will be bulking fibers. On the other hand, to achieve good insulating value, especially in the desired low thickness, microfibers will account for at least 25, and preferably at least 50 weight-percent of the blend. For purposes other than thermal insulation, microfibers may provide a useful function at lower amounts, though generally they will account for at least 10 weight-percent of the blend. Stated another way, the weight ratio of microfibers to bulking fibers in webs of the invention to be used as thermal insulation will generally be between 9:1 and 1:3, and preferably between 3:1 and 1:1, though for other purposes, the ratio of microfibers to bulking fibers may extend to 1:9.

Webs of the invention can be supplied in any desired thickness depending again on the particular use to be made of the web, but a convenient thickness is between about 4 and 100 millimeters. The loft or density[2] of the web can also be varied for particular uses, though generally the webs will have a loft of at least about 30 cubic centimeters/gram, and preferably of at least about 50 cubic centimeters/gram.

Composite fibrous webs of the invention are resilient so that after they have been stored under compression and then released from compression they quickly recover a substantial part of their original thickness. Military specifications specify that fibrous insulating webs to be used for garments, sleeping bags, etc., should, after a 24-hour period of compression under a pressure of 0.4 kilogram per square centimeter, achieve a 90 percent recovery of original thickness, within one hour after release of compression. Webs of the invention generally satisfy that test.

Fibrous webs of the invention may include minor amounts of other ingredients in addition to the microfibers are crimped bulking fibers. For example, fiber finishes may be sprayed onto a web to improve the hand and feel of the web. Or solid particles or non-crimped macrofibers may be included (see Braun, U.S. Pat. No. 3,971,373 for methods of inclusion) to add features provided by such particles or fibers. Solid materials added to the web generally lie in the interstices of the fiber structure formed by the microfibers and crimped bulking fibers, and are included in amounts that do not interrupt or take away the coherency or integrity of the fiber structure. The weight of the fiber structure minus additives is known as the "basis weight". This "basis weight" fiber structure, formed of microfibers and crimped bulking fibers, exhibits the resilient loftiness of a non-additive web of the invention. Loft of this "basis weight" fiber structure may be determined by following the process conditions used to prepare the additive-included web except for omitting introduction of the additives and measuring the loft of the resulting fiber structure.

Additives, such as dyes and fillers, may also be added to webs of the invention by introducing them to the fiber-forming liquid of the microfibers or crimped bulking fibers. Fibrous webs of the invention may be used by themselves or in combination with other sheet materials such as a liner for use in garments. In addition, the web may be processed after formation, as by quilting it to improve its handling characteristics for use in garments.

The invention will be further illustrated by the following examples:

EXAMPLES 1-4

A series of composite fibrous webs of the invention were prepared on apparatus as shown in FIG. 1 of the drawing using polyethylene terephthalate blown microfibers 0.7-1.8 micrometers in diameter and 13-decitex, 3.4 centimeters-long, 40-percent-crimp polyethylene terephthalate staple fibers. A series of webs were prepared including 12 weight-percent staple fiber (example 1 in the table below), 25 percent staple fiber (example 2), 41 weight-percent staple fiber (example 3), and 65 weight-percent staple fiber (example 4), with the balance in each case being blown microfibers. The webs were 1.2 centimeters thick and had a loft as given in Table 1. The thermal resistance of the webs, as measured by Method 2 of footnote 1, and the thermal insulating efficiency by weight of each of the samples is listed in Table 1. For the sake of comparison, the table also includes Comparative Examples A and B, A being a web prepared from 100 weight-percent polypropylene blown microfibers averaging 1-2 micrometers in diameter, with a thickness and loft of 1.2 centimeters and 21 cubic centimeters/gram, respectively; and B being a commercially available web of polyester staple fiber (6.3 decitex, 5.5 centimeter long, 40 percent crimp; "Dacron 88" fibers available from duPont). Absolute values of thermal resistance for Comparative Examples A and B were determined on a guarded hot plate (Method 1 in footnote 1) and then used to calibrate the water calorimeter used to obtain the rest of the results.

TABLE I

| Example No. | Loft (cubic centimeter/ gram) | Thermal Resistance (clo/ centimeter) | Thermal Insulating Efficiency by Weight ($\times 10^{-3}$ clo-square meter per gram) |
| --- | --- | --- | --- |
| Comparative Ex. A | 21 | 1.8 | 3.8 |
| 1 | 52 | 1.85 | 9.6 |
| 2 | 71 | 1.85 | 13.2 |
| 3 | 72 | 1.77 | 12.7 |
| 4 | 71 | 1.34 | 9.6 |
| Comparative Ex. B | 104 | 0.9 | 9.0 |

EXAMPLES 5-7

Three different composite fibrous webs of the invention were prepared using apparatus as shown in FIG. 1, from meltblown polypropylene microfibers that averaged 1-2 micrometers in diameter (with a few being in the 6-8 micrometer range) and polyethylene terephthalate fibers of three different diameters. In Example 5 the polyethylene terephthalate fibers were 7 decitex (25 micrometer diameter), 5.1-centimeter-long, 45 percent crimp; in Example 6, were 13 decitex (34 micrometer), 3.4-centimeter-long, 40 percent crimp; and in Example 7, were 60 decitex (74 micrometer), 6-centimeter-long, 25 percent crimp. The staple fibers were included in an amount as listed in Table II. The thermal resistance of the composite webs of Examples 5 and 6 was measured by Method 1 of footnote 1, and that of the web of Example 7 was measured by Method 2. Results were as given in Table II.

TABLE II

| Ex. No. | Amount of Staple Fiber (weight percent) | Loft (cubic centimeter/gram) | Thermal Resistance (clo/centimeter) | Thermal Insulating Efficiency by Weight ($\times 10^{-3}$ clo-square meter per gram) |
|---|---|---|---|---|
| 5 | 37 | 78 | 1.8 | 14 |
| 6 | 34 | 94 | 1.8 | 17 |
| 7 | 31 | 76 | 1.7 | 13 |

EXAMPLES 8–10

Composite fibrous webs of the invention were prepared in apparatus as generally described in FIG. 1 using 18-decitex (40 micrometer), 3.8-centimeter-long, 34-percent-crimp, polyethylene terephthalate staple fibers and microfibers, 70 percent of which were less than or equal to 0.8 micrometers in diameter and 30 percent of which were between 0.8 and 2 micrometers in diameter, and which were solution-blown from a solution comprising 18 percent polyacrylonitrile, 1 percent styrene, and 82 percent dimethylformamide. Three different webs were prepared using 10, 50 and 75 weight-percent, respectively, of the staple. The webs were 1.2 centimeters thick. The thermal resistance and thermal insulating efficiency by weight of the samples as measured by Method 1 of footnote 1 were as shown in Table III.

TABLE III

| Ex. No. | Amount Staple (weight percent) | Thermal Resistance (clo/centimeter) | Loft (cubic centimeter per gram) | Thermal Insulating Efficiency by weight ($\times 10^{-3}$ clo-square meter per gram) |
|---|---|---|---|---|
| 8 | 10 | 2.5 | 44 | 11 |
| 9 | 50 | 1.56 | 130 | 20 |
| 10 | 75 | 1.21 | 150 | 18 |

EXAMPLES 11–12

Two composite fibrous webs of the invention were prepared using melt-blown polypropylene microfibers averaging about 1–2 micrometers in diameter and 30-decitex (52 micrometers), 4.9-centimeters-long, 23-percent-crimp nylon staple fibers, each web including a different proportion of staple fiber as reported in TABLE IV. Thermal resistance values as measured on a guarded hot plate (ASTM D 1518-64) are reported in TABLE IV.

TABLE IV

| Ex. No. | Amount Staple (weight-percent) | Loft (cubic centimeter per gram) | Thermal Resistance (clo/centimeter) | Thermal Insulating Efficiency by Weight ($\times 10^{-3}$ clo-square meter per gram) |
|---|---|---|---|---|
| 11 | 11.5 | 60 | 1.7 | 10 |
| 12 | 18.1 | 81 | 1.6 | 13 |

EXAMPLE 13

A composite fibrous web of the invention was prepared using microfibers blown from a solution of polyacrylonitrile in dimethylformamide solvent, 70 percent being 0.8 micrometer or less, and the rest 2 micrometers or less in diameter, and 3-decitex (16 micrometer) 33-percent-crimp, 3.8-centimeters-long polyacrylonitrile staple fibers. The web included 42 weight-percent staple fiber and had a thickness and loft, respectively, of 1.2 centimeters and 103 cubic centimeter/gram. Thermal resistance measured by Method 2 was 1.7 clo per centimeter and the thermal insulating efficiency by weight was 17.6 $\times$ 10$^{-3}$ clo-square meter per gram. These values compare with a thermal resistance of 0.87 clo per centimeter and a thermal insulating efficiency by weight of 9.2 $\times$ 10$^{-3}$ clo-square meter per gram for a web made solely from the staple polyacrylonitrile fibers.

FOOTNOTES (1) The clo is a unit of thermal resistance defined as the amount of thermal resistance provided by an arbitrarily selected standard set of clothing. It is defined mathematically as:

$$1 \, clo = \frac{(0.18° \, C) \, (meter)^2 \, (hour)}{(kilo \, calories)}$$

Values of thermal resistance reported in the specification have been measured in either of two ways as specified below; the 1.8 and 0.9 values reported in the second paragraph of the specification were measured by Method 1.

METHOD 1

Measurement on a guarded hot plate in the manner described in ASTM S1518-64, with thickness measured as described in footnote 2 below.

METHOD 2

Water calorimeter

Three aluminum cylinders, 2.63 centimeters in diameter and 15.40 centimeters high, with a 3-centimeter-thick disc of cork insulation fit onto each end, are wrapped with layers of the test insulation to a thickness of 1.2 centimeters. The cylinders are then filled with 476 grams of water at 90° C. A thermometer and mixer bar are placed in the cans and each are placed on a magnetic mixer in an air conditioned room at 23 $\pm$ 0.5° C., and the temperature of the water in the cans and room temperature are recorded after 30 minutes and each 15 minutes thereafter for 4 hours.

The cooling curves obtained are then fit to the following equation using the method of least squares.

$$\ln \Delta t = a - bT,$$

where:

$\Delta t$ = the difference between the temperature of water in the can and room temperature $\ln$ = natural log $T$ = time elapsed since the first reading in minutes $a$ = experimentally determined intercept of the curve $b$ = experimentally determined slop of the curve which is a function of the calorimeter design, thickness of insulation which is held constant and thermal resistance of the test insulation Since the absolute calculation of heat flow in this type of calorimetric measurement is difficult and subject to error, each run was made with two standard samples, which had been run on the guarded hot plate, and one unknown sample. By using a commercial polyester fiber web known to have a thermal resistance of 0.9 clo/centimeter and a 100% blown polypropylene microfiber web known to have a thermal resistance of 1.8 clo centimeter as standards, linear interpolation can be used to find the thermal resistance of test web thus:

$$I = 0.9 + 0.9 \, [(b_f - b_x)/(b_f - b_m)]$$

$I$ = thermal resistance $b_f$ = slope of the experimentally measured curve for the commercial polyester fiber web $b_m$ = slope of the experimentally measured curve for the blown polypropylene microfiber web.

$b_x$ = slope of the measured curve for the web being tested (2) Since some webs take on an initial compression set when first compressed, the following procedure is used to measure thickness and loft:

A 10-centimeter by 10-centimeter section of web is cut and weighed to the nearest 0.01 gram and then placed under a flat plate and a weight of 40 kilograms (providing a pressure of 0.4 kilogram/square centimeter) for 24 hours, at which time the weight is removed and the sample allowed to recover undisturbed for 1 hour. The height is then measured using a plate and dial indicator exerting a total force of 14 gram (pressure of $1.4 \times 10^{-4}$ kilogram/square centimeter) on the web. From the weight and the thickness, the loft is easily calculated from the following equation:

$$L = (h)(100)/W$$

where:

$L$ = loft in cubic centimeter/gram
$h$ = thickness in centimeter
$W$ = weight of 10-centimeter-by-10-centimeter sample

What is claimed is:

1. A fibrous web comprising microfibers that average less than about 10 micrometers in diameter and crimped bulking fibers that have a percent crimp of at least about 15 percent, the microfibers and crimped bulking fibers being present in a weight ratio between about 9:1 and 1:9 and being randomly and thoroughly intermixed and intertangled with one another to form a resiliently compressible fiber structure that has a loft of at least 30 cubic centimeters/gram.

2. A web as defined in claim 1 in which the bulking fibers have a percent-crimp of at least 25 percent and a crimp count of at least 2 crimps per centimeter.

3. A web as defined in claim 1 in which the bulking fibers comprise between 25 and 75 weight-percent of the fibers in the web.

4. A web as defined in claim 1 which exhibits a loft of at least about 50 cubic centimeters/gram.

5. A web as defined in claim 1 which exhibits a thermal resistance of at least 1.5 clo/centimeter and a thermal insulating efficiency by weight of at least $10 \times 10^{-3}$ clo-square meter/gram.

6. A fibrous web useful as thermal insulation that provides a high thermal resistance per unit of thickness and is moderate in weight comprising microfibers that average less than about 10 micrometers in diameter and crimped bulking fibers having a percent crimp of at least about 15 percent, the microfibers and bulking fibers being present in a weight ratio between 9:1 and 1:3 and being randomly and thoroughly intermixed and intertangled with one another to form a resiliently compressible unbonded fiber structure having a loft of at least about 30 cubic centimeters/gram, and the web exhibiting a thermal resistance of at least about 1.3 clo/centimeter and a thermal insulating efficiency by weight of at least about $5 \times 10^{-3}$ clo-square meter/gram.

7. A web as defined in claim 6 in which the weight ratio of microfibers to bulking fibers is between about 3:1 and 1:1.

8. A web as defined in claim 6 in which the bulking fibers have a crimp count of at least about 2 crimps per centimeter.

9. A web as defined in claim 8 in which the bulking fibers have a percent crimp of at least about 25 percent.

10. A web as defined in claim 6 which exhibits a loft of at least about 50 cubic centimeters/gram.

11. A web as defined in claim 1 which further includes solid particles contained within the web.

* * * * *